United States Patent
Ariyavisitakul et al.

(10) Patent No.: US 9,479,236 B2
(45) Date of Patent: Oct. 25, 2016

(54) PRECODING AND SCHEDULING FOR A CELLULAR COMMUNICATION SYSTEM USING A LARGE NUMBER OF BASE STATIONS ANTENNAS

(71) Applicant: Broadcom Corporation, Irvine, CA (US)

(72) Inventors: Lek (Sirikiat) Ariyavisitakul, Alpharetta, GA (US); Louay Jalloul, San Jose, CA (US); Amin Mobasher, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 164 days.

(21) Appl. No.: 14/081,721

(22) Filed: Nov. 15, 2013

(65) Prior Publication Data

US 2014/0133417 A1 May 15, 2014

Related U.S. Application Data

(60) Provisional application No. 61/726,958, filed on Nov. 15, 2012.

(51) Int. Cl.
*H04B 7/04* (2006.01)
*H04W 72/12* (2009.01)
(Continued)

(52) U.S. Cl.
CPC .......... *H04B 7/0452* (2013.01); *H04B 7/0456* (2013.01); *H04B 7/0626* (2013.01); *H04B 7/0632* (2013.01); *H04B 7/0689* (2013.01); *H04L 25/03343* (2013.01); *H04L 25/03942* (2013.01); *H04W 72/121* (2013.01)

(58) Field of Classification Search
None
See application file for complete search history.

(56) References Cited

U.S. PATENT DOCUMENTS 8,385,441 B2 * 2/2013 Perets ................... H04L 1/0656
375/259
2003/0087629 A1 * 5/2003 Juitt et al. .................... 455/411
(Continued)

FOREIGN PATENT DOCUMENTS

JP          EP 2037646 A2 *   3/2009   ....... H04L 25/03343

OTHER PUBLICATIONS

International Search Report and Written Opinion of the International Searching Authority directed to related International Patent Application No. PCT/US2013/070375, European Patent Office, Rijswijk, Netherlands, mailed Jun. 13, 2014; 17 pages.

(Continued)

Primary Examiner — Vinncelas Louis
(74) *Attorney, Agent, or Firm* — Sterne, Kessler, Goldstein & Fox, P.L.L.C.

(57) ABSTRACT

For an infinite number of transmit antennas at a base station (BS), matched filter (MF) precoding (a type of precoding used to perform SU-MIMO transmission) becomes optimal for performing spatial multiplexing. But observations have shown that precoding types for performing MU-MIMO transmission can perform significantly better than MF precoding for a realizable number of transmit antennas at the BS, even while using the simplest precoding types for MU-MIMO transmission. For large inter-cell interference typically encountered by user terminals (UTs) at or near the boundary of the cell served by the BS, MF precoding can still be used to eliminate or reduce the need for coordination among cells, which consumes network and back-haul resources.

20 Claims, 4 Drawing Sheets

(51) Int. Cl.
*H04L 25/03* (2006.01)
*H04B 7/06* (2006.01)

(56) References Cited

U.S. PATENT DOCUMENTS

| | | | |
|---|---|---|---|
| 2009/0074099 A1* | 3/2009 | Zheng et al. | 375/267 |
| 2010/0142462 A1* | 6/2010 | Wang et al. | 370/329 |
| 2011/0194504 A1* | 8/2011 | Gorokhov et al. | 370/329 |
| 2012/0045018 A1 | 2/2012 | Zhou et al. | |
| 2012/0093016 A1* | 4/2012 | Zhang et al. | 370/252 |
| 2012/0195216 A1* | 8/2012 | Wu | H04W 72/0486 370/252 |
| 2012/0257664 A1* | 10/2012 | Yue et al. | 375/227 |
| 2013/0265955 A1* | 10/2013 | Kim | H04W 72/04 370/329 |

OTHER PUBLICATIONS

European Search Report directed to European Patent Application No. 13005393.9, Munich, Germany, mailed Mar. 5, 2014; 5 pages.

Naga, et al., "Performance Evaluation National Conference on Communications of Open Loop Multi-User MIMO Systems," National Conference on Communications (NCC), IEEE, Jan. 28, 2011; pp. 1-5.

Marzetta, Thomas L., "Noncooperative Cellular Wireless with Unlimited Numbers of Base Station Antennas," *IEEE Transactions on Wireless Communications*, vol. 9, No. 11, Nov. 2010, pp. 3590-3600.

International Preliminary Report on Patentability and Written Opinion of the International Searching Authority directed to related International Patent Application No. PCT/US2013/070375, dated May 19, 2015; 12 pages.

* cited by examiner

PRECODING AND SCHEDULING FOR A CELLULAR COMMUNICATION SYSTEM USING A LARGE NUMBER OF BASE STATIONS ANTENNAS

CROSS REFERENCE TO RELATED APPLICATIONS

This application claims the benefit of U.S. Provisional Patent Application No. 61/726,958, filed Nov. 15, 2012, which is incorporated by reference herein.

TECHNICAL FIELD

This application relates generally to precoding and scheduling for a cellular communication system that uses a large number of base station antennas.

BACKGROUND

In a cellular communication system, multiple antennas at a base station (BS) and multiple antennas at one or more user terminals (UTs) served by the BS allow two or more independent data streams to be transmitted from the BS to the UT(s) over the same time-frequency interval. The specific transmission technique that makes this possible is referred to as spatial multiplexing. In general, spatial multiplexing is a multiple-input, multiple-output (MIMO) transmission technique that uses the different "paths" or channels that exist between the multiple antennas at the BS and the multiple antennas at the one or more UTs to spatially multiplex the independent data streams over the same time-frequency interval. When one UT is served by the BS, the system is in single-user mode and when multiple UTs are served by the BS at the same time-frequency interval, the system is in multi-user mode.

The number of independent data streams that can be transmitted over the same time-frequency interval can be shown to be limited by the lesser of the number of antennas at the BS and the total number of antennas at the one or more UTs. Further limitations on the number of independent data streams that can be transmitted over the same time-frequency interval result from fast fading, imperfect channel state information (CSI) (which is used to perform spatial multiplexing), and uncorrelated interference.

In T. L. Marzetta, "Noncooperative Cellular Wireless with Unlimited Numbers of Base Station Antennas," *IEEE Transactions on Wireless Communications*, vol. 9, no. 11, pp. 3590-3600, November 2010 [Marzetta], a concept referred to as "massive MIMO" was introduced. In general terms, massive MIMO refers to a communication system that has an excess number of antennas available at the BS (and possibly at the UT) that can be used to reduce the effects of fast fading, imperfect channel state information (CSI), and uncorrelated interference when the BS is performing spatial multiplexing. Marzetta showed that when the number of antennas at the BS approaches infinity, the effects of fast fading, imperfect CSI, and uncorrelated interference vanish, leaving only inter-cellular interference caused by pilot contamination. Pilot contamination results from the reuse of pilot sequences in adjacent cells. Marzetta further showed that when the number of antennas at the BS approaches infinity one of the simplest forms of precoding, referred to as matched filtering (MF), becomes optimal for performing spatial multiplexing.

In general, the exact number of excess transmit antennas needed to qualify as massive MIMO is not strictly defined but, by at least one measure, is achieved when multiuser interference and noise become dominated by pilot contamination.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
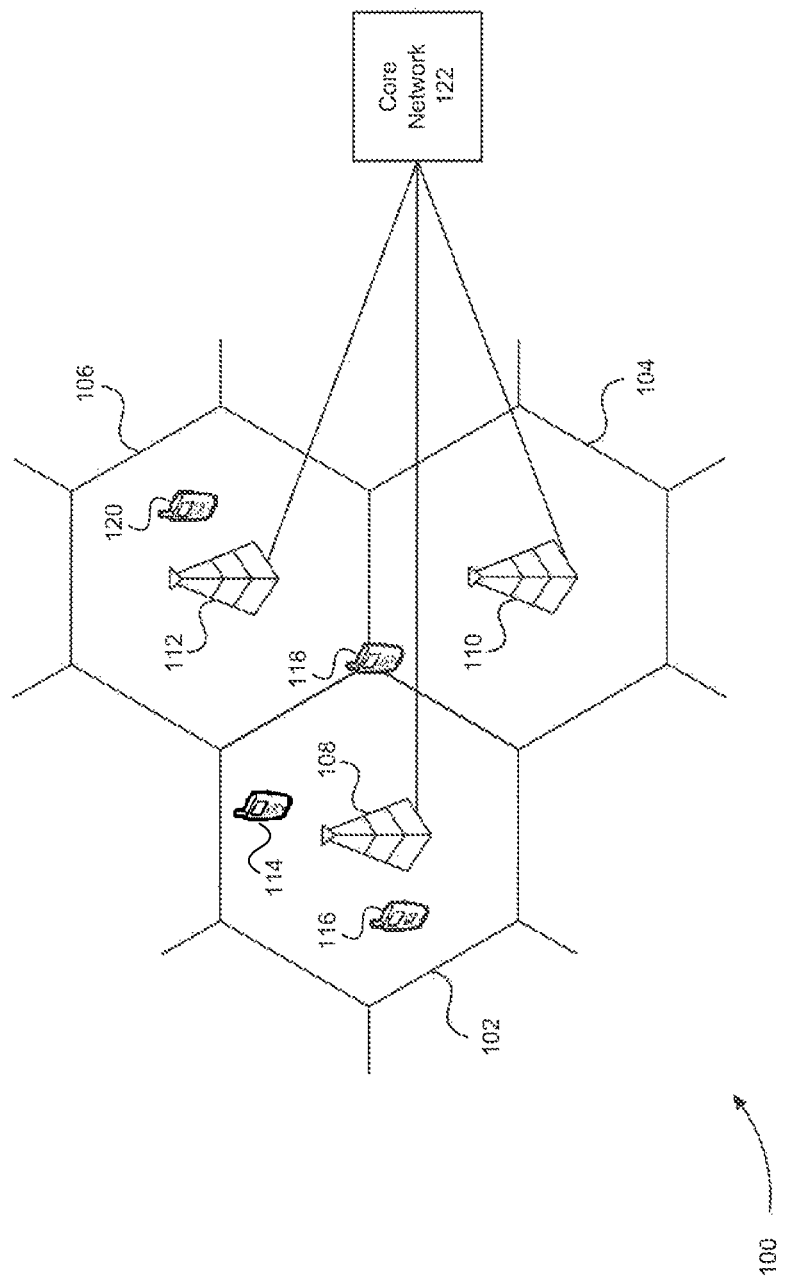
FIG. 1 illustrates an exemplary cellular network in which embodiments of the present disclosure can be implemented.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. OVERVIEW

Almost all techniques for transmitting multiple independent data streams from a BS over the same time-frequency interval to two or more UTs employ precoding. Precoding involves weighting the independent data streams at the BS before they are transmitted to maximize the received signal to noise and interference ratio, or to eliminate or minimize interference between the independent data streams intended for the different UTs. When the BS performs precoding, the signal transmitted by the BS can be written as:

$$x = F_1 s_1 + F_2 s_2 + \ldots + F_K s_K, \quad (1)$$

where $s_k$ is a $L_k \times 1$ data vector for the k-th UT (where $L_k$ is the number of data streams for the k-th UT), $F_k$ is a $N \times L_k$ precoding vector for the k-th UT (where N is the number of transmit antennas used at the BS), and K is the number of UTs.

Based on the vector x being transmitted by the BS, the signal received by the k-th UT can be written as:

$$y_k = H_k x + n_k, \quad (2)$$

where $n_k$ is a vector representing noise, and $H_k$ is a M×N channel matrix. Each entry in $H_k$ corresponds to a respective sub-channel between a respective transmit antenna at the BS and a respective receive antenna at the k-th UT. The number of columns N in $H_k$ is equal to the number of transmit antennas used at the BS, and the number of rows M in $H_k$ is equal to the number of receive antennas at the k-th UT.

In matched filter (MF) precoding (a type of precoding for performing what is referred to as single user (SU)-MIMO transmission), the precoding vector $F_k$ for the k-th UT is generally selected as the complex conjugate of $H_k$. As such, $F_k$ does not account for the channel characteristics of channels to UTs other than the k-th UT, which is the case for (the more complex) precoding types used to perform what is referred to as multi-user (MU)-MIMO transmission. Nonetheless, with a large number of excess transmit antennas at the BS, $H_k$ multiplied by x results in a large product for the terms of x that correspond to the k-th UT when MF precoding is used, and negligible products for other terms of x that correspond to the UTs other than the k-th UT. In the limit case, with an infinite number of transmit antennas, interference other than that caused by pilot contamination can be completely eliminated as shown by Marzetta.

Although Marzetta showed that, for an infinite number of transmit antennas at the BS, MF precoding becomes optimal for performing spatial multiplexing, observations by the inventors have shown that precoding types for performing MU-MIMO transmission can perform significantly better than MF precoding for a realizable number of transmit antennas at the BS (e.g., 10 to 300 transmit antennas), even while using the simplest precoding types for performing MU-MIMO transmission. Also, because the BS requires knowledge of the channels to the UTs for both MF precoding and the precoding types for performing MU-MIMO transmission, no additional channel estimation complexity is incurred. For large inter-cell interference (i.e., interference from other cells) typically encountered by UTs at or near the boundary of the cell served by the BS, MF precoding can be used to eliminate or reduce the need for coordination among cells (e.g., coordinated multipoint (CoMP) operation and inter-cell interference coordination (ICIC)—techniques currently being developed for LTE).

Accordingly, in at least one embodiment, the present disclosure is directed to a system and method for controlling a BS to precode data streams for downlink transmission to UTs at or near the boundary of the cell served by the BS in accordance with a SU-MIMO transmission mode and to precode data streams for downlink transmission to UTs within the cell (but not at or near the boundary of the cell) in accordance with a MU-MIMO transmission mode. These and other features of the present disclosure are described further below.

II. SYSTEM AND METHOD FOR PRECODING AND SCHEDULING DOWNLINK TRANSMISSIONS

Referring now to FIG. 1, an exemplary cellular network 100 in which embodiments of the present disclosure can be implemented is illustrated. Cellular network 100 is distributed over cells 102-106 that are each served by a respective base station (BS) 108-112. Cells 102-106 are geographically joined together to enable user terminals (UTs) 114-120 (e.g., mobile phones, laptops, tablets, pagers, or any other device with an appropriate wireless modem) to wirelessly communicate over a wide area with a core network 122 via BSs 108-112. Cellular network 100 can be operated in accordance with any one of a number of different cellular network standards, including one of the current or yet to be released versions of the long-term evolution (LTE) standard and the worldwide interoperability for microwave access (WiMAX) standard.

Assuming, for example, that BS 108 has multiple transmit antennas and that UTs 114 and 116 each have at least one receive antenna, BS 108 can perform the MIMO technique of spatial multiplexing to transmit a different independent data stream to each of UTs 114 and 116 over the same time-frequency interval. BS 108 can specifically employ precoding to weight the different independent data streams before they are transmitted to eliminate or minimize interference between them.

For an infinite number of transmit antennas at BS 108, SU-MIMO transmission using MF precoding becomes optimal for performing spatial multiplexing. But observations have shown that MU-MIMO transmission using its various types of precoding can perform significantly better in terms of sum capacity than MF precoding for a realizable number of transmit antennas at BS 108 (e.g., 10 to 300), even while using the simplest precoding types for performing MU-MIMO transmission. For large inter-cell interference typically encountered by UTs at or near the boundary of the cell served by BS 108, such as UT 118, MF precoding can be used to eliminate or reduce the need for coordination among cells, which may be needed in the case where precoding types for performing MU-MIMO transmission are used to transmit to these edge UTs.

Figure 2:
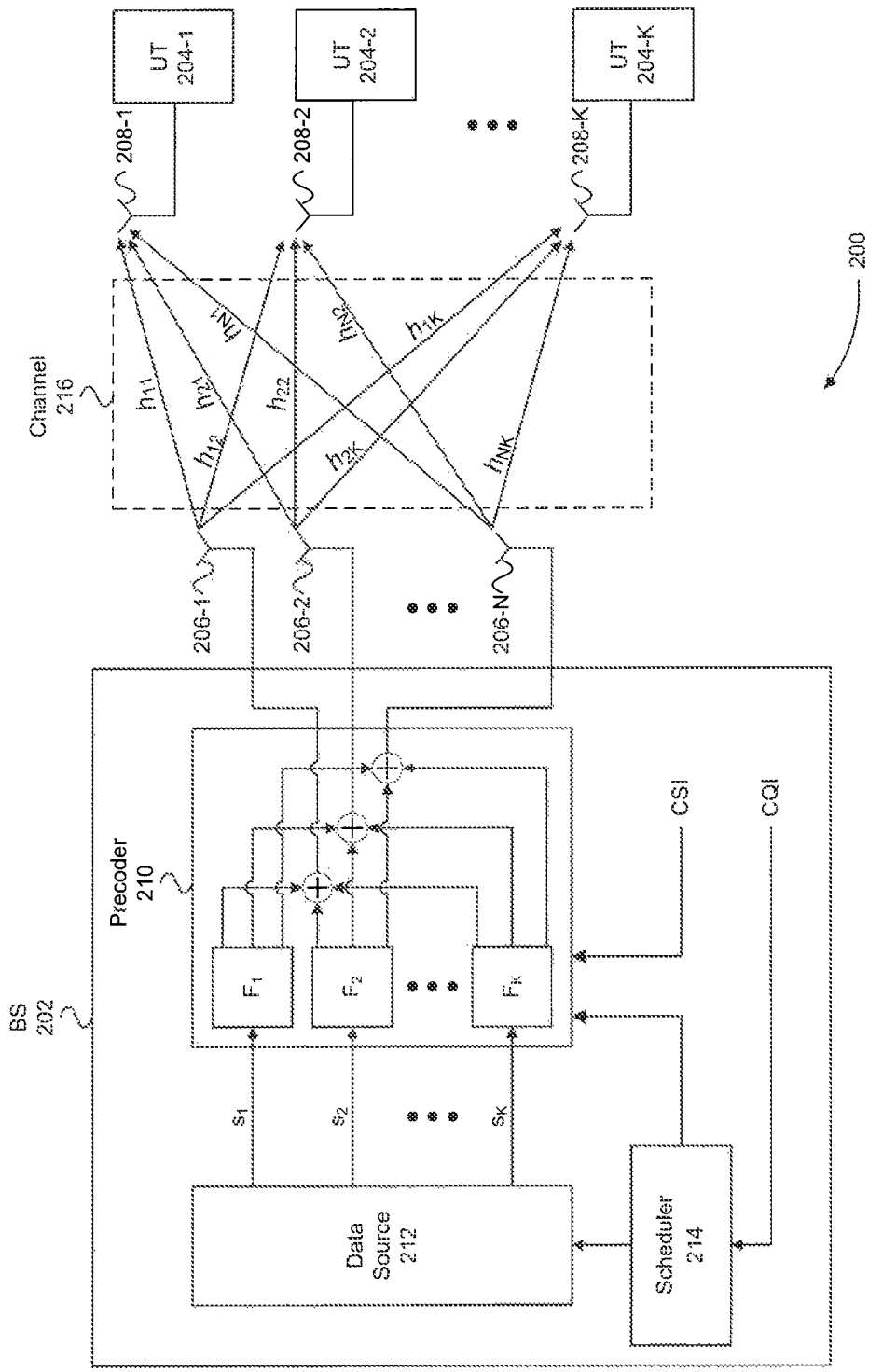
FIG. 2 illustrates a block diagram of an exemplary cellular communication system in accordance with embodiments of the present disclosure.

Referring now to FIG. 2, a block diagram of an exemplary cellular communication system 200 that includes a BS 202 and multiple UTs 204-1 through 204-K is illustrated in accordance with embodiments of the present disclosure. BS 202 can be, for example, BS 108 in FIG. 1, and UTs 204-1 through 204-M can be the different UTs served by BS 108. In the exemplary embodiment of FIG. 2, BS 202 includes N transmit antennas 206-1 through 206-N, and UTs 204-1 through 204-K each include a respective one of receive antennas 208-1 through 208-K.

In operation of cellular communication system 200, BS 202 is configured to transmit an independent data stream to each UT 204-1 through 204-K over the same time-frequency interval. BS 202 specifically uses a precoder 210 to precode the independent data streams before they are transmitted to eliminate or minimize interference between them. In FIG. 2, the independent data streams are labeled $s_1$ through $s_K$ and are provided to precoder 210 by a data source 212.

The precoded signal output by precoder 210 can be written as:

$$x = \Sigma_{i=1 \, to \, K} F_i s_i, \quad (3)$$

where $s_i$ is a $L_i \times 1$ data vector for the I-th UT (where $L_i$ is the number of data streams for the i-th UT), $F_i$ is a $N \times L_i$ precoding vector for the i-th UT (where N is the number of transmit antennas used at BS 202), and K is the number of UTs. Because each UT 204-1 through 204-K has only one receive antenna in the exemplary embodiment of FIG. 2, $L_i$ is necessarily equal to one and $s_i$ includes a single symbol.

Based on the precoded signal x being appropriately fed to and transmitted by the N transmit antennas 206-1 through 206-N at BS 202, the symbol received by the k-th UT can be written as:

$$y_k = H_k \cdot x + n_k, \quad (4)$$
$$= H_k \cdot \sum_{i=1 \text{ to } K} F_i s_i + n_k,$$

where $n_k$ is a vector representing noise, and $H_k$ is a M×N channel matrix for the k-th UT. Each entry in $H_k$ corresponds to a respective sub-channel (of channel 216) between a respective transmit antenna at the BS and a respective receive antenna at the k-th UT. The number of columns N in $H_k$ is equal to the number of transmit antennas used at BS 202, and the number of rows M in $H_k$ is equal to the number of receive antennas at the k-th UT, which in the example embodiment of FIG. 2 is again one for all UTs 204-1 through 204-K. To provide an example, the channel matrix $H_1$ for UT 204-1 is given by the vector $[h_{11} \ h_{21} \ \ldots \ h_{N1}]$.

The symbol $y_k$ received by the k-th UT generally includes interference from the symbols intended for the other UTs. This component of interference, referred to as intra-cell interference, can be written as follows:

$$H_k \cdot \Sigma_{i=1 \text{ to } K}^{i \neq k} F_i s_i \quad (5)$$

In MF precoding (a type of precoding for performing SU-MIMO transmission), the precoding vector $F_k$ for the k-th UT is generally selected as the complex conjugate of $H_k$. As such, $F_k$ does not account for the channel characteristics of channels to UTs other than the k-th UT, which is the case for (the more complex) precoding types used to perform MU-MIMO transmission. Nonetheless, with a large number of excess transmit antennas at BS 202, $H_k$ multiplied by x results in a large product for the terms of x that correspond to the k-th UT when MF precoding is used, and negligible products for other terms of x that correspond to UTs other than the k-th UT. In other words, the component of inter-user interference defined above in Eq. (5) becomes negligible. In the limit case, with an infinite number of transmit antennas, the inter-user interference other than that caused by pilot contamination can be completely eliminated as shown by Marzetta.

Although Marzetta showed that, for an infinite number of transmit antennas at BS 202, MF precoding becomes optimal for performing spatial multiplexing, observations have shown that precoding types for performing MU-MIMO transmission can perform significantly better than MF precoding for a realizable number of transmit antennas at BS 202 (e.g., 10 to 300 transmit antennas), even while using the simplest precoding types for performing MU-MIMO transmission, such as zero-forcing (ZF) precoding and minimum-mean square error (MMSE) precoding. Also, because BS 202 requires knowledge of the channels to UTs 204-1 through 204-K for MF precoding and precoding types for performing MU-MIMO transmission, no additional channel estimation complexity is incurred.

However, for large inter-cell interference typically encountered by UTs at or near the boundary of the cell served by BS 202, MF precoding can still be used to eliminate or reduce the need for coordination among cells, which may be needed in the case where precoding types for performing MU-MIMO transmission are used to transmit to these edge UTs.

Scheduler 214, further included in BS 202, is configured to classify UTs served by BS 202 as being either edge UTs (i.e., UTs at or near the boundary of the cell served by BS 202) or interior UTs (i.e., UTs within the cell but not at or near its boundary). How near a UT must be to the boundary of the cell in order to be considered an edge UT can be set based on a number of different factors as would be appreciated by one of ordinary skill in the art. In one embodiment, scheduler 214 uses channel quality indicators (CQI) received from the UTs served by BS 202 to classify them as either being edge UTs or interior UTs. For example, if a CQI received from a UT served by BS 202 is below a certain threshold, the scheduler can classify the UT as being an edge UT, and if the CQI is above the threshold, the scheduler can classify the UT as being an interior UT. It will be appreciated by one of ordinary skill in the art that other methods of classifying UTs as being either edge or interior UTs are possible.

After classifying individual UTs, the scheduler can then schedule a first set of independent data streams for two or more of the UTs classified as interior UTs for downlink transmission over a first time-frequency interval and a second set of independent data streams for one or more UTs classified as exterior UTs over a second time-frequency interval. As shown in FIG. 2, scheduler 214 can specifically control data source 212 to provide the first and second sets of data streams at appropriate times for precoding by precoder 210 and downlink transmission by transmit antennas 206-1 through 206-N.

In addition to the above, scheduler 214 can signal to precoder 210 the type of precoding to be performed. For transmissions to interior UTs, scheduler 214 can specifically signal to precoder 210 to use a precoding type for performing MU-MIMO transmission (e.g., ZF or MMSE precoding), and for transmissions to exterior UTs, scheduler 214 can signal to precoder 210 to use a precoding type for performing SU-MIMO transmission (e.g., MF precoding).

Similar to LTE, in order to avoid signaling the precoder to the UTs, the base station can use the UT specific pilots and precode both pilots and data to send the information. This way avoids signaling the precoder used by the base station to the UTs.

Further to the above, observations by the inventors have shown that, when the number of transmit antennas 206-1 through 206-N is around four or more times greater than the number independent data streams being transmitted over the same time-frequency interval to interior UTs, the simple precoding types of ZF and MMSE for performing MU-MIMO transmission can achieve a sum capacity very close to that of dirty paper coding. Given this, scheduler 214 can further be configured to schedule independent data streams for downlink transmission to UTs classified as interior UTs over the same time-frequency interval such that the number of transmit antennas 206-1 through 206-N is maintained to be around four or more times greater than the number independent data streams to be transmitted. This allows a high sum capacity to be achieved, while using the simple (in terms of computational complexity) precoding type of ZF or MMSE. Any of transmit antennas 206-1 through 206-N not required to maintain the transmit antenna to independent data stream ratio around the four to one mark can be used for a purpose other than transmitting the scheduled independent data streams or can be powered down to conserve power, for example.

In another embodiment, a threshold, determined based on the number of transmit antennas 206-1 through 206-N, can specifically be used by scheduler 214 to maintain the transmit antenna to independent data stream ratio. The threshold can be set equal to a value around one-forth the number of transmit antennas 206-1 through 206-N, such as a value within the range of one-fifth to one-third the number of transmit antennas 206-1 through 206-N, and the number of independent data streams scheduled to be transmitted over a given time-frequency interval can be maintained to be below this threshold.

In yet another embodiment, rather than maintaining the number of independent data streams to be transmitted over a given time-frequency interval below the threshold, scheduler 214 can switch precoding types based on whether the number of independent data streams exceeds the determined threshold. For example, if the threshold is not exceeded, then the simple precoding types of ZF or MMSE can be used. On the other hand, if the threshold is exceeded, scheduler 214 can use a more complex precoding type to perform MU-MIMO transmission, such as a non-linear precoding technique, to achieve a better sum capacity than that possible using ZF or MMSE type precoding.

Figure 3:
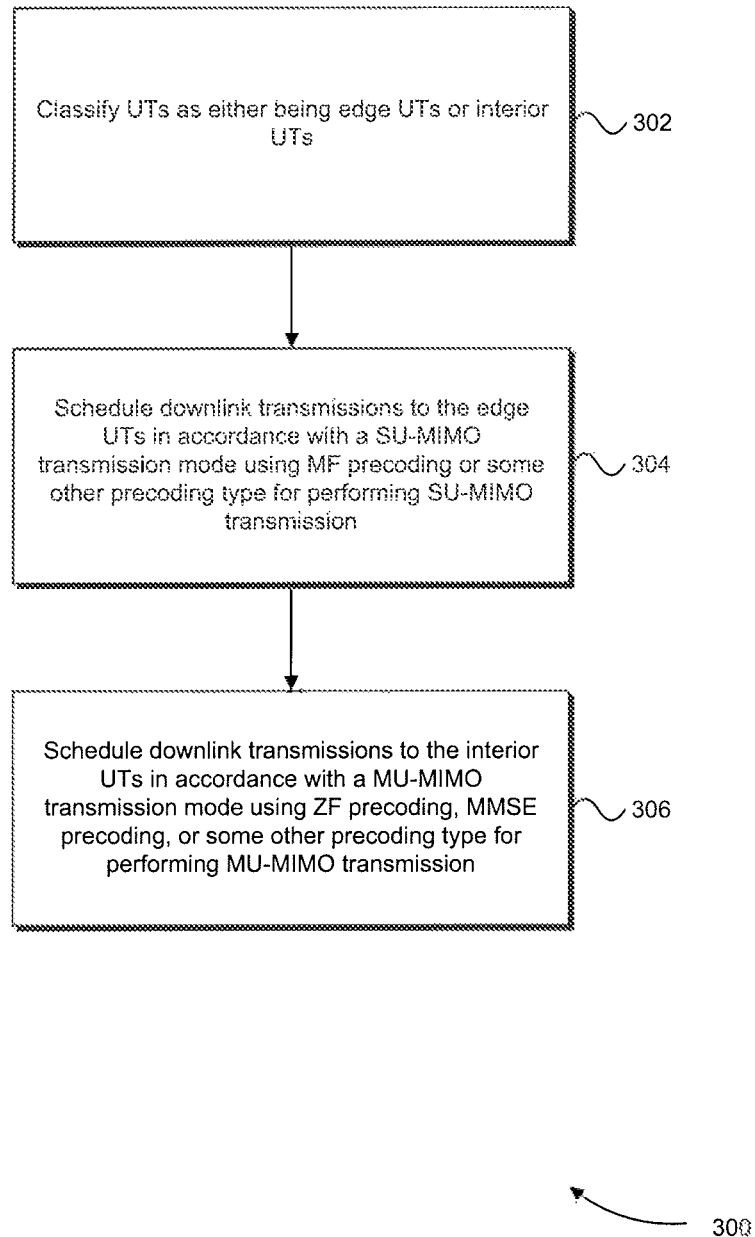
FIG. 3 illustrates a flowchart of a method for scheduling and precoding downlink transmissions from a BS to UTs in accordance with embodiments of the present disclosure.

Referring now to FIG. 3, a flowchart 300 of a method for scheduling and precoding downlink transmissions from a BS to UTs served by the BS is illustrated in accordance with embodiments of the present disclosure. The method of flowchart 300 can be implemented by BS 202 described above in FIG. 2. However, it should be noted that the method can be implemented by other devices as well. It should be further noted that some of the steps of flowchart 300 do not have to occur in the order shown in FIG. 3.

The method of flowchart 300 begins at step 302. At step 302, UTs served by the BS are classified as being either edge UTs or interior UTs. In one embodiment, channel quality indicators (CQI) received from the UTs are used to classify them as either being edge UTs or interior UTs. For example, if a CQI received from a UT is below a certain threshold, the UT can be classified as being an edge UT, and if the CQI is above the threshold, the UT can be classed as being an interior UT. It will be appreciated by one of ordinary skill in the art based on the teachings herein that other methods of classifying UTs as being either edge or interior UTs are possible.

At step 304, downlink transmissions to the edge UTs are scheduled in accordance with a SU-MIMO transmission mode using MF precoding or some other precoding type for performing SU-MIMO transmission.

At step 306, downlink transmissions to the interior UTs are scheduled in accordance with a MU-MIMO transmission mode using ZF precoding, MMSE precoding, or some other precoding type for performing MU-MIMO transmission. For example, several more complex non-linear precoding techniques can be used to perform MU-MIMO transmission.

III. EXAMPLE COMPUTER SYSTEM ENVIRONMENT

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 4:
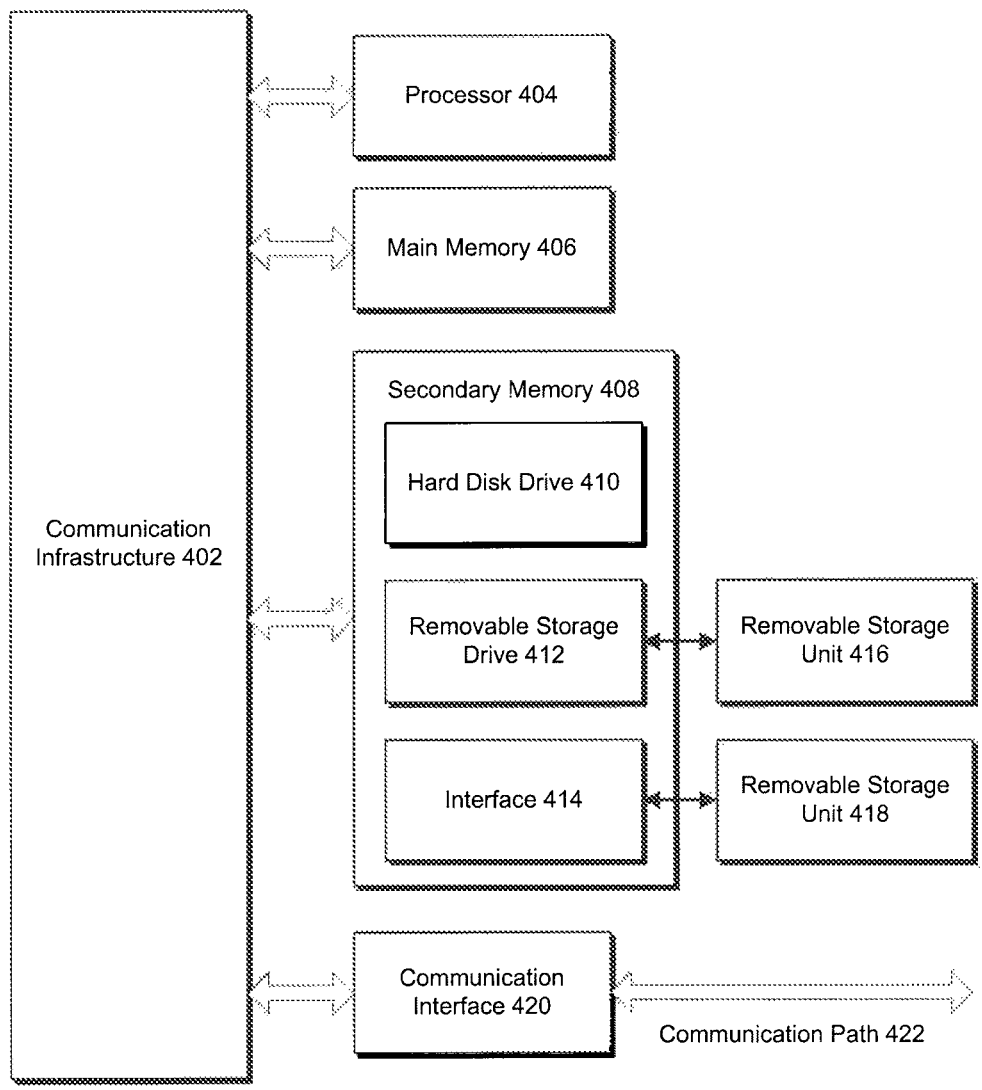
FIG. 4 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 400 is shown in FIG. 4. Modules depicted in FIG. 2 may execute on one or more computer systems 400. Furthermore, each of the steps of the method depicted in FIG. 4 can be implemented on one or more computer systems 400.

Computer system 400 includes one or more processors, such as processor 404. Processor 404 can be a special purpose or a general purpose digital signal processor. Processor 404 is connected to a communication infrastructure 402 (for example, a bus or network). Various software implementations are described in terms of this exemplary computer system. After reading this description, it will become apparent to a person skilled in the relevant art(s) how to implement the disclosure using other computer systems and/or computer architectures.

Computer system 400 also includes a main memory 406, preferably random access memory (RAM), and may also include a secondary memory 408. Secondary memory 408 may include, for example, a hard disk drive 410 and/or a removable storage drive 412, representing a floppy disk drive, a magnetic tape drive, an optical disk drive, or the like. Removable storage drive 412 reads from and/or writes to a removable storage unit 416 in a well-known manner. Removable storage unit 416 represents a floppy disk, magnetic tape, optical disk, or the like, which is read by and written to by removable storage drive 412. As will be appreciated by persons skilled in the relevant art(s), removable storage unit 416 includes a computer usable storage medium having stored therein computer software and/or data.

In alternative implementations, secondary memory 408 may include other similar means for allowing computer programs or other instructions to be loaded into computer system 400. Such means may include, for example, a removable storage unit 418 and an interface 414. Examples of such means may include a program cartridge and cartridge interface (such as that found in video game devices), a removable memory chip (such as an EPROM, or PROM) and associated socket, a thumb drive and USB port, and other removable storage units 418 and interfaces 414 which allow software and data to be transferred from removable storage unit 418 to computer system 400.

Computer system 400 may also include a communications interface 420. Communications interface 420 allows software and data to be transferred between computer system 400 and external devices. Examples of communications interface 420 may include a modem, a network interface (such as an Ethernet card), a communications port, a PCM-CIA slot and card, etc. Software and data transferred via communications interface 420 are in the form of signals which may be electronic, electromagnetic, optical, or other signals capable of being received by communications interface 420. These signals are provided to communications interface 420 via a communications path 422. Communications path 422 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 416 and 418 or a hard disk installed in hard disk drive 410. These computer program products are means for providing software to computer system 400.

Computer programs (also called computer control logic) are stored in main memory 406 and/or secondary memory 408. Computer programs may also be received via communications interface 420. Such computer programs, when executed, enable the computer system 400 to implement the present disclosure as discussed herein. In particular, the computer programs, when executed, enable processor 404 to implement the processes of the present disclosure, such as any of the methods described herein. Accordingly, such computer programs represent controllers of the computer system 400. Where the disclosure is implemented using software, the software may be stored in a computer program product and loaded into computer system 400 using removable storage drive 412, interface 414, or communications interface 420.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

IV. CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments.

What is claimed is:

1. A base station for switching between a single-user multiple-input multiple-output (SU-MIMO) transmission mode and a multiple-user multiple-input multiple-out (MU-MIMO) transmission mode, the base station comprising:
a data source configured to provide a plurality of data streams;
a scheduler configured to control the data source to provide as output a first set of the plurality of data streams intended for transmission to interior user terminals and a second set of the plurality of data streams intended for transmission to one or more edge user terminals; and
a precoder configured to precode the first set of the plurality of data streams in accordance with the MU-MIMO transmission mode and to precode the second set of the plurality of streams in accordance with the SU-MIMO transmission mode,
wherein the precoder is configured to precode the second set of the plurality of data streams using matched filter precoding and is configured to select a precoding type, other than the matched filter precoding, to precode the first set of the plurality of data streams based on the number of data streams in the first set of the plurality of data streams as compared to a threshold.

2. The base station of claim 1, wherein the scheduler is further configured to classify each of a plurality of user terminals as being a part of the interior user terminals or the one or more edge user terminals based on channel quality indication metrics received from the plurality of user terminals.

3. The base station of claim 1, wherein the precoding type is a zero-forcing precoding.

4. The base station of claim 1, wherein the precoding type is a minimum mean square error precoding.

5. The base station of claim 1, wherein each data stream in the first set of the plurality of data streams includes a symbol.

6. The base station of claim 1, wherein the scheduler is configured to control the data source such that the number of data streams in the first set of the plurality of data streams is less than the threshold.

7. The base station of claim 1, wherein the threshold is determined based on a number of transmit antennas configured to transmit the first set of the plurality of data streams to the interior user terminals.

8. The base station of claim 1, wherein the precoder is configured to select the precoding type to precode the first set of the plurality of data streams to be zero-forcing precoding based on the number of data streams in the first set of the plurality of data streams being less than the threshold.

9. The base station of claim 1, wherein the precoder is configured to select the precoding type to precode the first set of the plurality of data streams to be minimum mean square error precoding based on the number of data streams in the first set of the plurality of data streams being less than the threshold.

10. The base station of claim 9, wherein the threshold is determined based on a number of transmit antennas configured to transmit the first set of the plurality of data streams to the interior user terminals.

11. An apparatus, comprising:
a scheduler configured to control a data source to provide as output a first set data streams intended for transmission to interior user terminals of a cell in a cellular network and a second set of data streams intended for transmission to one or more edge user terminals of the cell in the cellular network; and
a precoder configured to precode the first set of data streams in accordance with a multiple-user multiple-input multiple-out (MU-MIMO) transmission mode and to precode the second set of data streams in accordance with a single-user multiple-input multiple-out (SU-MIMO) transmission mode,
wherein the precoder is configured to precode the second set of the plurality of data streams using matched filter precoding and is configured to select a precoding type, other than the matched filter precoding, to precode the first set of data streams based on the number of data streams in the first set of data streams as compared to a threshold.

12. The apparatus of claim 11, wherein the precoding type is a zero-forcing precoding.

13. The apparatus of claim 11, wherein the precoding type is a minimum mean square error precoding.

14. The apparatus of claim 11, wherein each data stream in the first set of data streams includes a symbol.

15. The apparatus of claim 11, wherein the scheduler is configured to control the data source such that the number of data streams in the first set of data streams is less than the threshold.

16. The apparatus of claim 11, wherein the threshold is determined based on a number of transmit antennas configured to transmit the first set of data streams to the interior user terminals.

17. A method, comprising:
controlling a data source to provide as output a first set of data streams intended for transmission to interior user terminals of a cell in a cellular network;
controlling the data source to provide a second set of data streams intended for transmission to one or more edge user terminals of the cell in the cellular network;
precoding the first set of data streams in accordance with a multiple-user multiple-input multiple-out (MU-MIMO) transmission mode;
precoding the second set of data streams, using matched filter precoding, in accordance with a single-user multiple-input multiple-out (SU-MIMO) transmission mode; and
selecting a precoding type, other than the matched filter precoding, to precode the first set of data streams based on the number of data streams in the first set of data streams as compared to a threshold.

18. The method of claim 17, wherein the threshold is determined based on a number of transmit antennas to be used to transmit the first set of data streams to the interior user terminals.

19. The method of claim 17, wherein the precoding type is a zero-forcing precoding.

20. The method of claim 17, wherein the precoding type is a minimum mean square error precoding.

* * * * *